United States Patent [19]
Baker

[11] 4,017,677
[45] Apr. 12, 1977

[54] SQUELCH CIRCUIT FOR A VIDEO RECORD PLAYER

[75] Inventor: Alfred Lynn Baker, Indianapolis, Ind.

[73] Assignee: RCA Corporation, New York, N.Y.

[22] Filed: June 26, 1975

[21] Appl. No.: 590,484

[30] Foreign Application Priority Data

Nov. 18, 1974 United Kingdom ............ 49924/74

[52] U.S. Cl. ...................... 358/127; 179/100.4 D; 179/100.4 M; 358/4; 358/8; 358/128
[51] Int. Cl.² ......................................... H04N 5/76
[58] Field of Search .... 178/6.6 R, 6.6 DD, 6.6 DC; 360/38; 179/100.3 V, 100.4 D, 100.4 M, 100.1 B; 358/4, 8

[56] References Cited
UNITED STATES PATENTS

| | | | |
|---|---|---|---|
| 3,408,457 | 10/1968 | Boylan | 11/6.6 DC |
| 3,428,762 | 2/1969 | Gedder et al. | 360/38 |
| 3,864,733 | 2/1975 | Boltz, Jr. | 360/38 |
| 3,909,518 | 9/1975 | Baker | 360/38 |
| 3,925,605 | 12/1975 | Rennick | 178/6.6 DC |

*Primary Examiner*—Raymond F. Cardillo, Jr.
*Attorney, Agent, or Firm*—Eugene M. Whitacre; William H. Meagher

[57] ABSTRACT

In a video disc player, a first FM signal recovered from the disc is subject to frequency demodulation to obtain a composite color video signal, and a second FM signal recovered from the disc is also demodulated to obtain an accompanying sound signal. The player includes a defect detector, monitoring the first FM signal to identify carrier frequency departures from the intended deviation range, and switching apparatus for effecting a substitution of stored video signals, in replacement of the output of the video FM detector, when the defect detector identifies such departures. A squelch control signal generator is rendered responsive to an output of the defect detector, and develops a squelch signal when the defect indication persists beyond a predetermined minimum length of time. The squelch signal is employed to inhibit the passage of sound and video signals to player output terminals. The squelch control signal generator is additionally rendered responsive to player apparatus controlling placement of the player stylus in and out of playback position (e.g., controlling lowering/lifting of stylus arm), so that removal of stylus from playback position initiates squelch signal development without need for passage of said predetermined minimum length of time.

14 Claims, 3 Drawing Figures

SQUELCH CIRCUIT FOR A VIDEO RECORD PLAYER

The present invention relates generally to disc players and squelch circuits therefor, and particularly to squelch circuits of a form advantageous for use in video disc players.

In U.S. Pat. No. 3,842,194, issued to Jon K. Clemens of Oct. 15, 1974, a video disc recording/playback system is disclosed in which recorded information appears in the form of geometric variations in the bottom of a spiral groove in the surface of a disc substrate covered by a conductive coating, with a dielectric layer overlying the conductive coating. A playback stylus, including a conductive electrode affixed to an insulating support, is received in the record groove. The stylus is supported by a pickup arm mounted in an enclosure which is driven radially (with respect to the rotating turnable upon which the record is received) to facilitate tracking of successive convolutions of the record groove with a substantailly contant stylus attitude. the stylus electrode cooperates with the disc coatings to form a capacitance which varies, as the disc is rotated, in accordance with the groove bottom geometry variations passing beneath the stylus electrode. Appropriate circuitry coupled to the stylus electrode translates the capacitance variations to electrical signal variations representative of the recorded information.

In a desirable form of the above-described capacitive video disc system, the recorded picture information comprises a first carrier frequency modulated in accordance with composite video signals and appears in the form of successive groove bottom depth alternations between maximum and minimum depths. Pursuant to an approach explained in the copending application of Eugene O. Keizer, Ser. No. 441,069, now U.S. Pat. No. 3,911,476, the picture information is desirably accompanied by sound informaton, comprising a second carrier (significantly lower in frequency than said first carrier) frequency modulated in accordance with audio signals and appearing in the form of "duty cycle" modulation of the depth alternations.

In a player for video discs of the above-described type, respective FM demodulators with appropriate input filtering are conveniently provided for reapectively recovering audio and video signals from the FM signals obtained by disc playback.

In operation of a video disc player of the abovedescribed type to recover recorded video signals for image display purposes, a problem that may occur (unless compensated) in the displayed picture is the intermittent appearance in random locations of disturbances in the form of white and/or black spots and streaks supplanting the appropriate picture informaton. These picture defects may vary in length, thickness and persistence of appearance. While not destructive of the picture information as a whole, the intermittent appearance of such picture defects can be a source of considerable annoyance to the viewer.

An analysis of the problem has revealed that a variety of different causes may lead to the production of different ones of the annoying picture spots and streaks. Some of the causes may be associated with defects in the record itself. Other causes may be associated with the conditions encountered in a particular playing of a given disc (e.g., stylus encounters with debris of various forms in various regions of the disc groove). Still other causes (e.g., scratches, dents, etc.) may be associated with the past history of use or abuse of the disc being played. Without further detailing of the causes of the picturedefects, it is clear that there are myriad causes of differing types which result in the problem having a high degree of unpredictability, and varying from disc to disc, play to play, groove region to groove region, etc.

In the copending application of Jon K. Clemens, et al, entitled, Ser. No. 477,102, now abandoned in favor of continuation application Ser. No.594,429, a system is disclosed for effectively masking the effects of signal defects during video disc playback. In the Clemens, et al. arrangement of the aforesaid Clemens, et al. application, now issued as U.S. Pat. No. 4,001,496, defect detection involves reliance upon indentification of those instances in which the instantaneous input frequencies to the player's picture FM detector fall outside the intended picture FM signal deviation range limits. The defect detector output serves to control the switched substitution of information from a preceding image line for current information. Because of the general redundancy of information in successive image lines, the substitution of the preceding line information serves to mask the defect occurrence, rendering it relatively unnoticeable to the image viewer.

In video disc players of the above-described type, there are a variety of instances where it may be desirable to inhibit the delivery of signals to the player outputs, because of the nature of the pickup circuit output. Some of these instances may be associated with transient or otherwise faulty pickup conditions. Other instances may be associated with various desirable modes of operation, provided in the player for such desired effects as standby, start-up, search, shut-down, etc., but which do not involve development of usable signals by the pickup circuits. For output inhibition in the outlined circumstances, it has been proposed in the prior art to utilize the output of a deflection synchronizing component separator in the video signal processing circuits of the player to determine the existence of conditions appropriate for squelching the player outputs; that is, to monitor the sync separator ooutput and initiate the squelch mode when sync pulses are absent for a given length of time, and to terminate the squelch mode when sync pulses return.

One of the problems encountered with a squelching system relying upon the monitoring of a sync separator output is that, under certain of the circumstances in which the maintenance of a squelched condition is desired, the input to the sync separator comprises noise which may be falsely interpreted by the sync separator as sync. pulses, leading to a premature end of the squelched condition.

The present invention is directed to a squelching system in which maintenance of a desired squelched condition is rendered relatively immune to false termination by noise. Pursuant to the principles of the present invention, the development of a squelching signal is rendered responsive to means identifying departures of the instantaneous frequency of the input to a player's FM detector from a predetermined, intended carrier deviation range.

In players employing a defect compensation system of the general type described in the aforementioned Clemens et al. application, such a departure identifying means is already present as the defect detector for the defect compensation system; in these circumstances, the squelch signal generator may conveniently be rendered responsive to the defect detector output. Desirable, the defect detector output to which the squelch signal generator is responsive incorporates, or is subjected to, a "stretching" technique, such as described in the aforementioned Clemens, et al. application, whereby the resultant defect indication pulse, once initiated, persists until a given length of time passes without an input frequency departure from the predetermined deviation range. The nature of the noise output of the player's pickup circuits, under conditions of usable signal absence, is typically such that convenient choices of the "stretching" parameters will ensure maintenance of a stretched defect indication pulse throughout period of usable signal absence.

It is, of course, desirable that the extreme measure of output squelching not occur, for example, for those defect durations during which a defect compensation system, such as described above, can provide effective defect masking. Pursuant to a further feature of the present invention, squelch signal initiation does not occur in response to a defect indication input, unless and until the defect indication persists for a given length of time. The given length of time is desirably long relative to a line duration interval, with an illustrative choice being 50 milliseconds.

While the aforementioned delay of squelch activation is desirable to avoid, during the course of record playback, unmerited and/or premature squelching in the presence of record pickup defects, it poses the problem that when the stylus is lifted from the record, for such desirable player operation purposes as pause, search, or shut-down, noise may be delivered to the player outputs for the delay period duration before squelching commences. The delay period is typically long enough to allow, for example, an offensive burst of audio noise to be reproduced. Pursuant to an additional feature of the present invention, this annoying effect may be obviated by rendering the squelch signal generator additionally responsive to removal of the stylus from its play position, with the additional response not subject to activation delay. Pursuant to a specific embodiment of the present inventon, wherein removal of the stylus from a play position is controlled by a solenoid actuated stylus arm lifting/lowering mechanism, the additional input to the squelch signal generator is derived from the stylus solenoid energization control circuits.

In video disc players of the type discussed herein, the video signal processing system may incorporate circuitry that requires a period of time for stabilization, following the initiation of pickup of proper input signals, before one may be assured of development of presentable player output signals. An example of such circuitry is a phase locked loop system provided for jitter stabilization purposes, and employing a gate circuit for passing color synchronizing burst components of a chrominance signal being processed to a phase detector, such as is described in U.S. Pat. No. 3,872,497, issued on Mar. 18, 1975, to J. G. Amery, et al. Pursuant to further features of an advantageous embodiment of the present invention, (a) the point of squelch applcation in the video signal processing circuits of the player is subsequent to the point of burst takeoff for a PLL system of the aforesaid type, as well as subsequent to the point of takeoff for timing information controlling the burst gating pulse generation, whereby the PLL system functioning is not blocked by the squelching action; and (b) return of the player to an unsquelched mode is delayed relative to the end of squelch activation inputs for a time of sufficient length (e.g., one second) to permit PLL system stabilization.

Objects and advantages of the present invention will be recognized by those skilled in the art upon a reading of the following detailed description and an inspection of the accompanying drawings in which:

FIG. 1 provides a plan view, partially broken away, of a portion of the structure of a video disc player in which practice of the present invention may be carried out;

Figure 1:
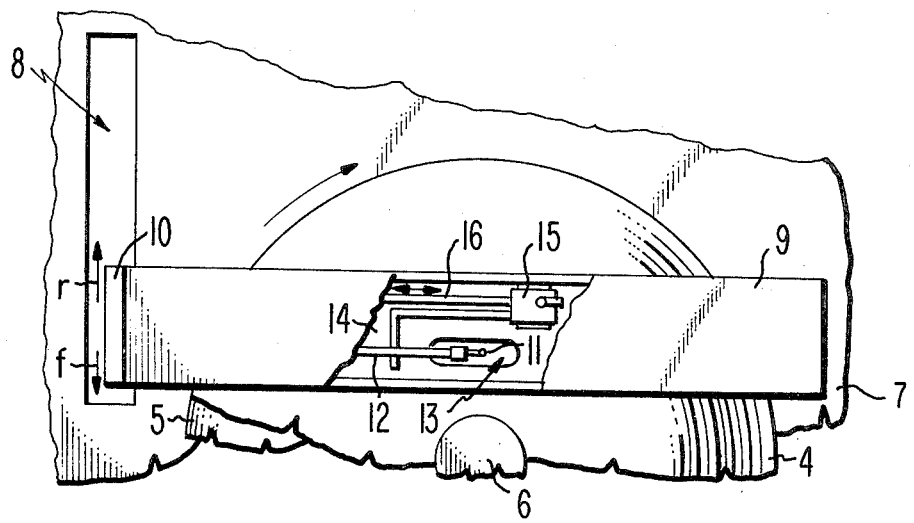

In FIG. 1 of the drawings, a disc 4, illustratively a video disc of a type described in the aforesaid Clemens patent, is shown during its playback supported by a turntable 5 rotating above a motorboard 7, with the disc's central aperture centered about a spindle 6. A stylus 11, having its tip received in the record groove, is supported at one end of a pickup arm structure 12. The pickup arm structure 12, which may illustratively be of the form shown in a copending application of Byron K. Taylor, Ser. No. 522,814, filed Nov. 12, 1974, now U.S. Pat. No. 3,956,581 is pivotally supported at its opposite end (not shown) within an enclosure 9.

The enclosure 9 is secured to a bracket 10 which extends through a slot 8 in the motor board 7. Beneath the motorboard 7 is apparatus (not shown) for selectively supplying drive to the enclosure 9 via the bracket 10. Illustratively, the drive apparatus is of the form shown in U.S. Pat. No. 3,870,320, issued to L. Torrington on Mar. 11, 1975, permitting selection of: (a) radial drive in a forward direction ("f", in the drawing) at a first, "play" speed, so related to the turntable rotation speed as to facilitate stylus tracking of successive convolutions of the record grove with a substantially constant stylus attitude; (b) radial drive in direction "f", at a second, "forward search" speed, higher than said "play" speed; and (c) radial drive in the reverse direction ("r", in the drawing) at a "reverse search" speed, comparable to said forward search speed.

Additionally mounted in the enclosure 9 is a rotor 15, to which is secured a bellcrank lever 14, having a portion extending beneath the pickup arm structure 12 at an intermediate point thereof. Rotation of rotor 15, by a cable 16 secured thereto, permits movement of the bellcrank lever between: (1) a depressed position permitting lowering of the pickup arm structure 12 to a play position in which the stylus end of the arm structure portrudes through an aperture 13 in the bottom of enclosure 9 to a degree permitting engagement of the tip of stylus 11 with the groove of disc 4; and (2) an elevated position, such that the stylus is removed from groove engagement.

Figure 2:
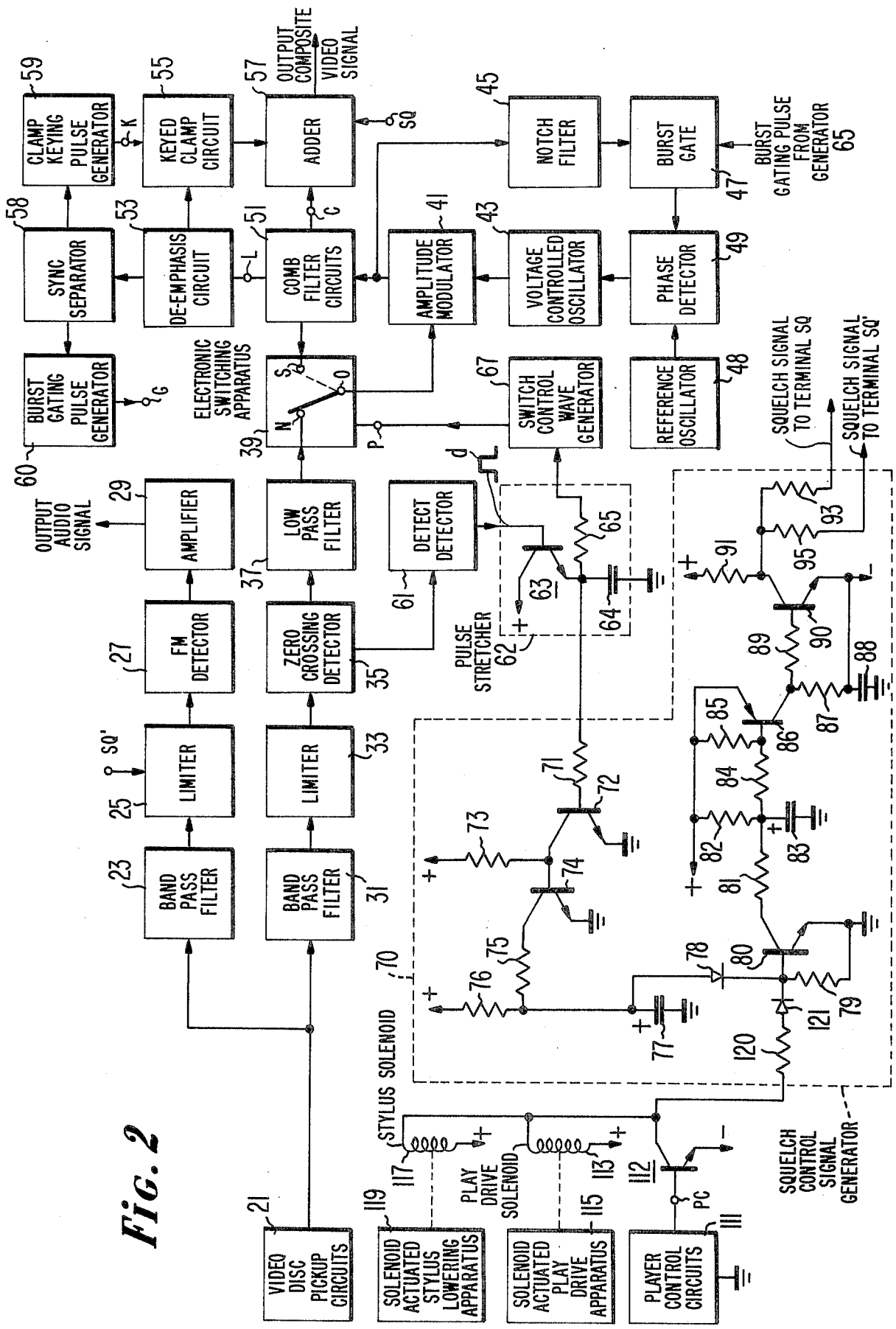
FIG. 2 illustrates, partially schematically and partially by block diagram representation, a circuit arrangement for the FIG. 1 video disc player, incorporating a squelch system in accordance with an embodiment of the present invention.

In FIG. 2, a layer circuit arrangement is depicted which may be advantageously employed in video disc player apparatus of the FIG. 1 form. In the FIG. 2 arrangement, a recorded signal is recovered during playback of a video disc by video disc pickup circuits 10, which may be, for example, as described in U.S.

Pat. No. 3,872,240, issued to D. J. Carlson, et al. on Mar. 18, 1975. Illustratively, the recording format for the disc is such that the recovered signal includes: (a) a frequency modulated picutre carrier, the instantaneous carrier frequency deviating within fixed deviation range limits (e.g., 3.9–6.9 MHz.) in accordance with the amplitude of a composite color video signal occupying a band of frequencies (e.g., 0–3 MHz.) below the deviation range, and representative of a succession of color images to be displayed; and (b) a frequency modulated sound carrier, the instantaneous carrier frequency deviating within a narrow band about a low frequency carrier value (e.g., 0.7 MHz.) in accordance with the amplitude of an audio signal, representative of a desired sound accompaniment for the color image display.

A bandpass filter 23, having a pass band encompassing the sound carrier deviation range and appropriate sidebands thereof, selectively passes the frequency modulated sound carrier signal to a limiter 25. The limiter output is applied to an FM detector 27 to recover the recorded sound information. The output of detector 27 is amplified by amplifier 29 to form the player's output audio signal. Where the player signals are to be applied to the antenna terminals of a television receiver, the output of amplifier 29 may serve as the sound information input to transmitter apparatus, as described, for example, in U.S. Pat. No. 3,775,555, issued to D. J. Carlson on Nov. 27, 1973.

A bandpass filter 31, having a pass band encompassing the picture carrier deviation range and appropriate sidebands thereof, selectively passes the frequency modulated picture carrier components in the output of pickup circuits 21 to a limiter 33. The limiter output is applied to a zero-crossing detector 35. The zero-crossing detector may comprise circuits of well-known type for developing an output pulse of a fixed amplitude, width and polarity in response to each zero-crossing of the limited input FM signal. The pulse output of the zerocrossing detector 35 is supplied to a low pass filter 37, having a pass band substantially matching the band (e.g., 0–3 MHz) occupied by the recorded video signal information.

The zero-crossing detector 35 and low pass filter 37 form an FM detector of a so-called pulse counter type, providing an output in the form of a composite video signal corresponding to the modulation of the input FM signal. Illustratively, the video signal informaton recovered from the disc comprises a composite color video signal encoded in a "buried subcarrier" format, as disclosed in U.S. Pat. No. 3,872,498, issued to D. H. Pritchard on March 18, 1975.

For purposes of illustration, the following parameters may be assumed to be descriptive of the buried subcarrier form of the recorded composite color video signal: (1) Color subcarrier frequency $(f_b) = 195/2f_H$, or approximately 1.53 MHz, when the line frequency $(f_H)$ corresponds to the U.S. standard for color television broadcasting; (2) Chrominance signal: sum of respective quadrature related subcarrier phases respectively amplitude modulated with red and blue color difference signal (R-Y, B-Y) of 0–500 KHz bandwidth, with equal bandwidth (500 KHz) upper and lower sidebands preserved (and carrier suppressed); (3) Luminance signal (Y) bandwidth: 0–3 MHz; (4) Color synchronizing component: burst of oscillations at buried subcarrier frequency $(f_b)$ of reference phase and amplitude, during horizontal blanking "backporch" (corresponding to standard NTSC color synchronizing component in all but frequency).

Also responding to an output of the zero-crossing detector 35 is a defect detector 61, which may, illustratively, be of the type shown in the aforementioned copending U.S. Pat. application of J. K. Clemens, et al., Ser. No. 477,102. Defect indication pulses developed by the defect detector 61 are supplied via a pulse stretcher 62 to a switch control wave generator 67, which develops signals for controlling the switching state of electronic switching apparatus 39. Reference may be made to the copending U.S. Pat. Application of A. L. Baker, Ser. No. 477,103, now U.S. Pat. No. 3,909,518, for a detailed description of the pulse stretcher function, and of suitable apparatus for performing the functions of generator 67 and switching apparatus 39.

Electronic switching apparatus 39 serves the purpose of alternatively: (1) completing a signal path between a "normal" signal input terminal N and the switching apparatus output terminal O, or (2) completing a signal path between a "substitution" signal input terminal S and the output terminal O. Switching between the respective "normal" and "substitution" states is controlled by the output of switch control wave generator 67, which is applied to the control signal input terminal P of the switching apparatus 39.

The output terminal O of the switching apparatus 39 is coupled to the modulating signal input terminal of an amplitude modulator 41. The "normal" input signal to the switching apparatus 39 (i.e., the signal applied to terminal N, and conveyed therefrom to the modulating signal input terminal of modulator 41 during the normal mode of operation of the video disc player) is the composite video signal output of the low pass filter 37. The "substitution" input signal (i.e., the signal applied to terminal S, and conveyed therefrom to the modulating signal input terminal of modulator 41 during a defect masking, or "substitution", mode of operation of the player) is a delayed composite video signal derived in a manner to be subsequently described.

Amplitude modulator 41 serves to modulate the amplitude of carrier waves, supplied by a voltage controlled oscillator 43, in accordance with the signals delivered from the switching apparatus output terminal O. Amplitude modulator 43 is desirably of the singly balanced type (balanced against the modulating signal). The nominal frequency $(f_c)$ of the carrier waves supplied by oscillator 43 corresponds to the sum of the buried subcarrier frequency $(f_b)$ and a desired output subcarrier frequency $(f_o)$, and illustratively corresponds to $325 f_H$, or approximately 5.11 MHz (for the instance where the desired output subcarrier frequence corresponds to the NTSC subcarrier frequency of $455/2f_H$, or approximately 3.58. Illustratively, oscillator 43 is a voltage controlled crystal oscillator such as in shown in the copending U.S. Pat. application of T. Burrus, Ser. No. 522,816, now U.S. PAT. No. 3,965,482.

Desirably, the frequency of the carrier waves developed by oscillator 43 varies about the aforesaid nominal frequency in cnsonance with the "jitter" of the frequencies of the composite video signal recovered during record playback. For this purpose, the voltage controlled oscillator 43 is associated with control circuitry in an arrangement forming a phase locked loop system, such as disclosed in the aforesaid Amery, et al. U.S. Pat. (No. 3,872,497).

In the control arrangement of the herein illustrated video disc player apparatus, the output frequency of oscillator 43 is controlled by the output of a phase detector 49, which compares in phase the color synchronizing component recovered from the record, and the output of a reference oscillator 48. Reference oscillator 48 operates at the desired output subcarrier frequency ($f_o$), and is desirably crystal controlled. The color synchronizing component is supplied by a burst gate 47, which responds to an outut of amplitude modulator 41 supplied via a notch filter 45. Notch filter 45 bars passage of the relatively large amplitude carrier component in the modulator output.

Burst gate 47 desirably incorporates bandpass filter circuitry confining its response to frequencies in the output chrominance band about the output subcarrier frequency ($f_o$). Controlled by suitably timed, line frequency, gating pulses the burst gate 47 selectively passes the filtered output of modulator 41 appearing during the "backporch" interval occupied by the color synchronizing component. The output of burst gate 47 comprises periodic bursts of oscillations which will nominally be at the output subcarrier frequency, the synchronizing bursts falling at that frequency in the lower sideband of the output of modulator 41.

The closed loop system formed in the manner described immediately above functions to hold the synchronizing burst compOnent in the lower sideband of the output of modulator 41 in frequency (and phase) synchronism with the highly stable output of reference oscillator 48. As jitter of the recovered composite video signal occurs, tending to cause a departure from such synchronism, the control voltage output of phase detector 49 produces a compensating adjustment of the frequency of oscillator 43 to oppose such departure.

The amplitude modulated carrier wave output of modulator 41 is applied to the input of comb filter circuits 51,which are illustratively of the type described in a copending U.S. Pat. application of J. G. Amery, Ser. No. 570,325, now U.S. Pat. No. 3,969,757. The comb filter circuits 51 develop: (a) at output terminal C, a separated chrominance signal component in the highband location desired for output use, suitable for application to an outputcomposite signal forming circuit (constituted by an adder 57); (b) at output terminal L, a separated luminance signal component; and (c) a delayed composite video signal which serves as the "substitution" signal input to terminal S of switching apparatus 39.

The luminance signal developed at terminal L is supplied to a de-emphasis circuit 53 which provides a de-emphasis of luminance component high frequencies in a manner suitably complementary to the pre-emphasis thereof employed in the disc recording operation. The output of the de-emphasis circuit 53 is applied to a clamp circuit 55, which serves to restore the DC component of the luminance signal. Illustratively, the clamp circuit 55 is of the keyed clamp type, and keyed by periodic, line rate, keying pulses timed to coincide with periodic reference amplitude intervals of the luminance signal (e.g., during horizontal sync tip apearances).

The clamped output of circuit 55 forms the luminance component input to adder 57, which serves to add such input to the highband chrominance component output at terminal C to develop an output composite color video signal of a form suitable for application to a color television receiver. Where such application is to be to the receiver's antenna terminals, the output of adder 57 may serve as the composite video signal input to transmitter apparatus of such a form, for example, as is shown in the aforesaid U.S. Pat. No. 3,775,555, issued to D. J. Carlson.

The player apparatus of FIG. 2 also includes a sync separator 58, disposed to be responsive to the output of de-emphasis circuit 53 and serving to separate deflection synchronizing components from the picture-representative signal components of the luminance comb filter output. An output of sync separator 58 is supplied to a clamp keying pulse generator 59 to accurately time the generation of keying pulses for application to the above-discussed keyed clamp circuit 55. Also responsive to an output of sync separator 58 is a burst gating pulse generator 60, developing gating pulses timed to substantially coincide with the periodic appearances of color synchronizing burst components in the output of modulator 41. The gating pulse output of generator 60 establishes the signal passing intervals for burst gate 47 in the PLL system controlling VCO 43. Reference may be made to my copending U.S. Pat. application, Ser. No. 590,485, Entitled "Sync Responsive Systems for Video Disc Players", and concurrently filed herewith, for an illustration of suitable apparatus for performing the functions of separator 58 and generators 59, 60.

Pursuant to the principles of the present invention, the player of FIG. 2 includes a squelch control signal generator 70, responding to an output of pulse stretcher 62. An illustrative circuit arrangement for pulse stretcher 62 and generator 70 is schematically illustrated in FIG. 2. As shown, pulse stretcher 62 includes an NPN transistor, with its collector connected to a positive potential supply, and its base receiving positive-going defect indication pulses "d" from the output of defect detector 61. A capacitor 64 is coupled between the emitter of transistor 63 and a point of ground potential. The capacitor 64 is shunted by a signal path formed by the series combination of resistor 71 and the base-emitter path of an input NPN transistor 72 of the generator 70. An additional shunting path across capacitor 64 includes resistor 65 and the input circuit (not schematically shown) of the switch control wave generator 67.

When a defect indication pulse "d" appears at the base of transistor 63, the transistor conducts and capacitor 64 charges to a positive potential, rendering transistor 72 conducting. When the defect indication pulse "d" at the base of transistor 63 terminates, transistor 63 cuts off but transistor 72 continues conduction due to the charge retained by capacitor 64. The discharge of capacitor 64 is effected via a path including the resistor 71 and the base-emitter path of transistor 72 (and the additional shunting path conprising resistor 65 and the input circuit of generator 67). Illustratively, the discharge time constant is chosen so that a time interval of approximately 3 microsecond must follow the defect indication pulse termination (without a new defect indication pulse appearance) before transistor 72 cuts off.

An NPN transistor 74 as its base connected to the collector of transistor 72, its emitter connected to a point of ground potential, and its collector connected via the series combinaton of resistors 75 and 76 to a positive potential source. A resistor 73 is connected between the positive potential source and the base of transistor 74, whereby transistor 74 is normally biased into conduction. However, during each stretched defect pulse, the conducting state of transistor 72 holds transtor 74 off.

A capacitor 77 is connected between a point of ground potential and the junction of resistors 75 and 76. The capacitor 77 is shunted by the series combination of diode 78 and resistor 79, with the base-emitter path of an NPN transistor 80 coupled across resistor 79 in such manner that the base of transistor 80 is connected to the cathode of diode 78. When transistor 74 is cut off, capacitor 77 charges toward the potential of the potential of the positive potential source, with the charging current flowing through resistor 76. The charging time constant is chosen so that if cutoff of transistor 74 persists for a predetermined large number of line intervals (e.g., 50 milliseconds), the potential across capacitor 77 becomes sufficiently positive to forward bias diode 77 and transistor 80 into conduction.

The collector of transistor 80 is connected to the positive potential source via the series combination of resistors 81 and 82. A capacitor 83 is connected between a point of ground potential and the junction of resistors 81 and 82, and the series combination of resistors 84 and 85 is connected across resistor 82. A PNP transistor 86 has its emitter connected to the positive potential source, its base connected to the junction of resistors 84 and 85, and its collector connected via a resistor 87 to a negative potential source (shunted by capacitor 88). An NPN transistor 90 has its base connected via resistor 89 to the collector of transistor 86, its emitter connected to the negative potential source, and its collector connected via a resistor 91 to the positive potential source.

In the absence of recent conduction by transistor, the charging of capacitor 83 (via resistor 82, and via resistors 84 and 85) is suchas to preclude conduction by transistors 86 and 90. Under these circumstances, the collector of transistor 90 is at a positive potential. Respective resistors 93 and 95 communicate this potential, as an enabling potential, to (a) the squelch input terminal SQ of output composite video signal adder 57, and (b) the squelch input terminal SQ' of sound channel limiter 25. In the presence of such enabling, both sound and video channels of the video disc player are free to supply, as player outputs, information derived by disc playback.

However, whenever transistor 80 is rendered conducting, capacitor 83 is rapidly discharged, permitting transistor 86 to turn on and drive transistor 90 into conduction. The potential at the collector of transistor drops to the potential of the negative potential source, and communication of this potential to terminals SQ and SQ' serves to squelch the output composite video signal adder 57 and the sound channel limiter 25, precluding passage of information from the video disc pickup circuits as sound and picture signal outputs of the player.

When cutoff of transistor 72 occurs at the termination of a stretched defect pulse, transistor 74 resumes conduction, and capacitor 77 discharges sufficiently to take diode 78 and transistor 80 out of conduction. Transistors 86 and 90, however, continue conduction, after turn off of transistor 80, until recharging of capacitor 83 is sufficiently complete to raise the base of transistor 86 above the conduction threshold potential. Cutoff of transistors 86 and 90 then occurs, and enabling potentials reappear at terminals SQ and SQ'.

The charging time constant for capacitor 83 is chosen so that the delay of turn off of transistor 90 relative to the turn off of transistor 80 is sufficiently long (e.g., one second) as to permit stabilization of such player circuitry as the PLL system associated with VCO 43 to occure prior to the passage of playback information to the player outputs. It will be noted that the point of application of the video squelch signal (at composite video signal adder 57) is subsequent in the video signal processing circuitry to the takeoff points for control of the inputs to the burst gate of this PLL system, whereby the desired system stabilization can take place under the delay squelch conditions.

Premature unsquelching of adder 57 (and limiter 25) is substantially precluded in above-described system; noise in the output of video disc pickup circuits 21, in the absence of usable signals, tends to maintain a stretched defect pulse output, to which generator 70 reponds by maintaining a squelched condition for the player sound and video outputs.

It is not desirable that player squelching should be initiated each time the onset of a defect is detected by detector 61. For defects encountered in disc playback of up to several line intervals in length, the player's defect compensation system (utilizing generator 67, switching apparatus 39, et al.) produces a highly satisfactory defect masking effect. For even longer defects, it is preferable to continue the defect substitution effort, even if less than fully effective, rather than to initiate squelching, in view of the aforementioned relatively long (e.g., one second) recovery time desirably incorporated in the squelch control signal generator 70. A delay, of the order of the aforementioned 50 millisecond duration, is accordingly appropriately associated with the response of transistor 80 to the cut-off of transistor 74. Thus, a stretched defect pulse must last for an appropriately large number (e.g., 800) of line intervals, before initiation of a squelch signal will ensue.

A consequence of the aforementioned delay of the response of transistor 80 to the cut-off of transistor 74 is, however, a delay of squelching when such player operating modes as pause, search and shut-down are initiated with a removal of the stylus from the record groove. The delay length is typically sufficiently long as to permit an annoying burst of noise to be processed before squelching occurs. To avoid such an effect, particularly annoying with respect to sound reproduction, generator 70 is rendered responsive to an additional input, derived from apparatus associated with stylus positioning.

The player arrangement of FIG. 2 is shown as including a solenoid acutated play drive apparatus 115 and a solenoid actuated stylus lowering apparatus 119. A play drive solenoid, serving to control actuation of the play drive apparatus 115, is schematically represented by solenoid winding 113; and a stylus solenoid, serving to control actuation of the stylus lowering apparatus 119, is schematically represented by solenoid winding 117. Each of the windings 113, 117 is connected between a positive potential source and the collector of an NPN transistor 112. The emitter of transistor 112 is returned to a negative potential source, and the base of transistor 112 is connected to an output terminal PC of player control circuits 111.

When the player control circuits 111 develop a potential at output terminal PC that forward biases the base-emitter path of transistor 112, conduction occurs in transistor 112, lowering its collector potential toward the negative source potential. Under these conditions, current flows through the solenoid windings 113, 117 with a magnitude sufficient to actuate the play drive apparatus 115 and the stylus lowering apparatus 119. The result, with reference to the illustrative structure of FIGURE 1, is: (a) a rotation of rotor 15 and bellcrank lever 14 that allows a downward pivoting of stylus arm 12 to a position permitting record groove reception of the tip of stylus 11; and (b) engagement of a drive via bracket 10 that establishes a radial motion for enclosure 9 in the forward direction "f" at a speed appropriate to groove tracking with a substantially constant stylus attitude. Thus, during the normal "play" mode of the illustrated player, when stylus position and enclosure drive are appropriate for the recovery by pickup circuits 21 of the information recorded in successive regions of the record groove, the potential at the collector of transistor 112 is substantialy the potential of the negative potential source.

However, for other operating modes (e.g., pause, search etc.) of the player arrangement of FIGURE 2, the player control circuits 111 are arranged to supply a cut off potential at terminal PC that terminates conduction by transitor 112. With transistor 112 in a nonconductive state, the solenoid windings 113 and 117 are no longer traversed by a current appropriate to actuation of the play drive apparatus 115 and stylus lowering apparatus 119. The solenoid de-energization results in: (a) an opposite direction rotation of rotor 15 (FIGURE 1) that causes elevation of stylus arm 12 by lever 14, removing stylus 11 from record groove engagement; and (b) disengagement of enclosure 9 and bracket 10 from the apparatus supplying forward radial drive at the normal play speed. Under such conditions, when stylus position and enclosure drive are not appropriate for the recovery by pickup circuits 21 of recorded information, the potential at the collector of transistor 112 approaches the potential of the positive potential source.

The squelch control signal generator 70 is rendered responsive to the mode indicating potential at the collector of transistor 112 by the coupling of the series combination of resistor 120 and diode 121 between the collector of transistor 112 and the base of transistor 80. The diode is poled (with its cathode connected to the base of transistor 80) so as to be non-conductive during the "play" mode when transistor 112 is conducting. Thus, during the "play" mode, the base of transistor 80 is isolated from transistor 112, and control of transistor 80 depends upon previously described conditions associated with the charging of capacitor 77. When, however, the player is removed from the "play" mode by development of a cut off potential at terminal PC, the rise in the potential at the collector of transistor 112 forward biases diode 121, and enables the immediate turn-on of transistor 80 (if it has been in the non-conductive state prior to that time) to promptly initiate squelching signal application to terminals SQ and SQ'. One is thus assured that stylus lifting, effected under the command of the player control circuits 111, will be accompanied by substantially immediate squelching action, without the need for waiting for a defect indication to persist for the delay interval previously described in connection with the charging of capacitor 77.

Figure 3:
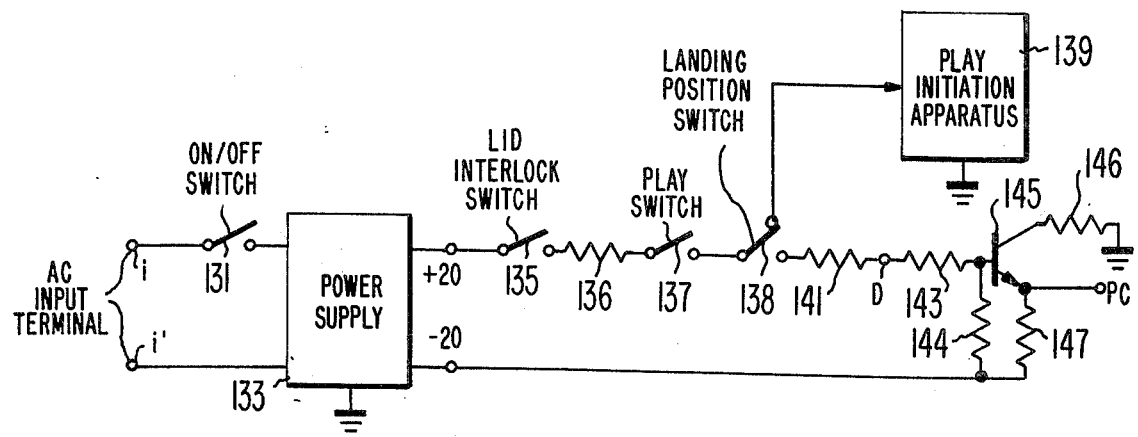
FIG. 3 illustrates, partially schematically and partially by block diagram representation, a system that may be employed to perform player control circuit functions in the player arrangement of FIG. 2.

FIGURE 3 provides a partial and simplified illustration of circuit arrangements that may illustratively be employed in serving some of the functions performed by the player control circuits 111 of FIGURE 2. In FIGURE 3, a pair of alternating current input terminals $i, i'$ are shown as coupled to the input of a power supply 133, with an on/off switch 131 interposed in the coupling from terminal "$i$". When the on/off switch 131 is closed, power supply 133 receives an alternating current input and develops therefrom a positive DC potential (at an output terminal labeled +20) and a negative DC potential at an output terminal labeled −20).

The +20 terminal of power supply 133 is coupled to one terminal of resistor 136 by a lid interlock switch 135, when the lid interlock switch 135 is closed by a closing of the video disc player lid. The remaining terminal of resistor 136 is connected to an input terminal of a landing position switch 138 by a "play" switch 137, when the "play" switch 137 is closed by a player operator desiring to initiate record playback action.

The landing position switch 138 is, illustratively, of a single pole, double throw form, with its throw position dependent upon the location of the driven enclosure 9 (FIGURE 1). When the enclosure 9 is in its rest position clear of turntable 5, the throw position of switch 138 is (as illustrated in solid line in FIGURE 3) such as to link the input terminal of switch 138 with an input of play initiation apparatus 139. Thus, when switches 131, 135 and 137 are all closed with enclosure 9 in its rest position, a positive DC potential is supplied from power supply 133 to the input of the play initiation apparatus 139 via switch 135, resistor 136, switch 137 and switch 138.

Illustratively, the player initiation apparatus 139 responds to the appearance of the positive DC potential input by energizing a motor drive for effecting rotation of the turntable 5 (FIGURE 1) and by engaging a drive for enclosure 9 that provides radial motion therefor in the forward direction "f" at a speed faster than the aforementioned playdrive speed. As the moving enclosure 9 arrives at a position locating the stylus 11 over outer convolutions of the record groove containing the beginning of the disc's recorded information, the landing position switch 138 is tripped to its second throw position (shown by dotted line in FIGURE 3).

In the second throw position of switch 138, the switch input terminal is connected via the series combination of resistors 141 and 143 to the base of NPN transistor 145. The emitter of transistor 145 is connected to the −20 terminal of power supply 133 by a resistor, and the base of transistor 145 is connected to the −20 terminal by a resistor 144. A resistor 146 is connected between the collector of transistor 145 and a point of ground potential.

When switch 138 is in its first throw position, transistor 145 is in a non-conductive state. Under such conditions, the emitter of transistor 145, and the control circuit output terminal PC connected thereto, is at the potential of the negative potential source. However, when switch 138 is tripped to its second throwposition by enclosure movement over a disc, a turn-on potential is supplied to the base of transistor 145 from the +20 terminal via switch 135, resistor 136, switch 137, switch 138, and resistors 141, 143. The resultant conduction by transistor 145 causes a rise in the potential at output terminal PC toward ground potential. The effect of such a rise on the FIGURE 2 circuitry is conduction by transistor 112, with resultant energization of the play drive and stylus solenoids.

Not shown in the simplified presentation of FIGURE 3, for example, are the means provided in the player control circuits for maintaining energization of the turntable motor when switch 138 is in its second throw position. Also not shown in the simplified presentation of FIGURE 3 are control circuits for achieving such player operating modes as pause or search. However, illustratively, such additional circuitry may incorporate suitable means coupled to terminal D (at the junction of resistors 141 and 143) for selectively precluding the development of sufficient forward bias across the base-emitter path of transistor 145 to allow its conduction. When such additional circuitry is selectively active, the resultant turn-off of transistor 145 serves to cut off transistor 112 of the FIGURE 2 arrangement, with consequent forward biasing of diode 121 and squelch action initiation as desired.

An illustrative set of values for circuit parameters of the schematically illustrated portion of FIGURE 2 is as follows:

| | |
|---|---|
| Resistor 65 | 2,200 ohms |
| Resistor 71 | 33,000 ohms |
| Resistor 73 | 10,000 ohms |
| Resistor 75 | 220 ohms |
| Resistor 76 | 100,000 ohms |
| Resistor 79 | 15,000 ohms |
| Resistor 81 | 220 ohms |
| Resistor 82 | 68,000 ohms |
| Resistor 84 | 68,000 ohms |
| Resistor 85 | 27,000 ohms |
| Resistor 87 | 68,000 ohms |
| Resistor 89 | 15,000 ohms |
| Resistor 91 | 2,700 ohms |
| Resistor 93 | 150,000 ohms |
| Resistor 95 | 10,000 ohms |
| Resistor 120 | 120,000 ohms |
| Capacitor 64 | 470 picofarads |
| Capacitor 77 | 4.7 microfarads |
| Capacitor 83 | 10 microfarads |
| Capacitor 88 | .1 microfarad |
| Diodes 78, 121 | Type 1N914 |
| Transistor 63 | Type 2N3904 |
| Transistors 72,74,80,90 | Type MPSA20 |
| Transistor 86 | Type MPSA70 |
| Transistor 112 | Type MPSA06 |

What is claimed is:

1. In a record player, including pickup apparatus for recovering from a record, when said pickup apparatus is in a playback position, carrier waves subject to frequency modulation in accordance with a composite video signal occupying a given frequency band; the combination comprising:
   frequency demodulation apparatus responsive to a carrier wave output of said pickup apparatus for developing a demodulated signal output substantially confined to said given frequency band;
   signal processing means normally responsive to said demodulated signal output of said frequency demodulation apparatus for developing an ouput composite video signal;
   delay means, normally responsive to said demodulated signal output of said frequency demodulation apparatus, for providing a delayed composite video signal;
   means coupled to said frequency demodulation apparatus for identifying departures of the instantaneous frequency of the input to said demodulation apparatus from a given frequency deviation range;
   means for developing defect indication pulses in response to the output of said departure identifying means;
   means responsive to the output of said defect indication pulse developing means for rendering said output composite video signal developing means responsive to said delayed composite video signal, instead of said demodulated signal output of said frequency demodulation apparatus, during the occurrence of a defect indication pulse;
   means responsive to the output of said defect indication pulse developing means for initiating development of a squelch signal when the duration of a defect indication pulse exceeds a given length of time; and
   means for utilizing said squelch signal to inhibit development of said output composite video signal by said signal processing means.

2. Apparatus in accordance with claim 1 wherein said defect indication pulse developing means includes means for stretching the duration of the developed defect indication pulse relative to the duration of frequency departure identification such that, upon initiation of said defect indication pulse development, the defect indication pulse endures until a period of time of predetermined length passes, where said period of time of predetermined length is short relative to said given length of time.

3. Apparatus in accordance with claim 2 also including:
   means for delaying the termination of squelch signal development relative to the termination of defect indication pulse development for a chosen time period, said chosen time period being long relative to said given length of time.

4. In a record player, including pickup apparatus for recovering from a record, when said pickup apparatus is in a playback position, carrier waves subject to frequency modulation in accordance with a composite video signal occupying a given frequency band; the combination comprising
   frequency demodulation apparatus responsive to a carrier wave output of said pickup apparatus for developing a demodulated signal output substantially confined to said given frequency band;
   means for processing said demodulated signal output of said frequency demodulation apparatus to develop an output composite video signal;
   means coupled to said frequency demodulation apparatus for identifying departures of the instantaneous frequency of the input to said demodulation apparatus from a given frequency deviation range;
   means for developing defect indication pulses in response to the output of said departure identifying means;
   means responsive to the output of said defect indication pulse developing means for initiating development of a squelch signal when the duration of a defect indication pulse exceeds a given length of time;
   means for utilizing said squelch signal to inhibit development of said output composite video signal by said signal processing means;
   player control means for selectively removing said pickup apparatus from said playback position; and
   means coupled between said player control means and said initiating means for rendering said initiating means responsive to said selective removal of said pickup apparatus from said playback position in such manner tht squelch signal development is initiated in response to said selective removal within a time period which is short relative to said given length of time.

5. In a record player, including pickup apparatus for recovering from a record, when said pickup apparatus is in a playback position, carrier waves subject to frequency modulation in accordance with a composite video signal occupying a given frequency band wherein said composite video signal includes a deflection synchronizing component, a color synchronizing component and picture signal components comprising a luminance signal component occupying said given frequency band and a chrominance signal component sharing a portion of said given frequency band; the combination comprising:

frequency demodulation apparatus responsive to a carrier wave output of said pickup apparatus for developing a demodulated signal output substantially confined to said given frequency band;

means for processing said demodulated signal output of said frequency demodulation apparatus to develop an output composite video signal; said signal processing means including:

a. first comb filter means responsive to said demodulated signal output of said frequency demodulation apparatus for developing a first comb filtered signal output including said deflection synchronizing component and said luminance signal component, to the substantial exclusion of said color synchronizing component and said chrominance component;

b. second comb filter means responsive to said demodulated signal output of said frequency demodulation apparatus for developing a second comb filtered signal output, in a band of frequencies above said given frequency band, and including said color synchronizing component and said chrominance component, to the substantial exclusion of said deflection synchronizing component and said luminance component; and c. adding means responsive to the respective outputs of said first and second comb filter means for forming said output composite video signal;

means coupled to said frequency demodulation apparatus for identifying departures of the instantaneous frequency of the input to said demodulation apparatus from a given frequency deviation range;

means for developing defect indication pulses in response to the output of said departure identifying means;

means responsive to the output of said defect indication pulse developing means for initiating development of aa squelch signal when the duration of a defect indication pulse exceeds a given length of time; said defect indication pulse developing means including means for stretching the duration of the developed defect indication pulse relative to the duration of frequency departure identification such that, upon initiation of said defect indication pulse development, the defect indication pulse endures until a period of time of predetermined length passes without a departure identification by said identifying means, where said period of time of predetermined length is short relative to said given length of time;

means for delaying the termination of squelch signal development relative to the termination of defect indication pulse development for a chosen time period, said chosen time period being long relative to said given length of time; and means for utilizing said squelch signal to inhibit development of said output composite video signal by said signal processing means;

wherein said squelch signal utilizing means comprises means for applying said squelch signal to said adding means to disable said adding means.

6. Apparatus in accordance with claim 5 wherein said signal processing means also includes:

means for separating said deflection synchronizing component from the other components of said composite video signal, said separating means being responsive to an output of said first comb filter means; and a phase locked loop system, subject to operation with independence of the disabled or enabled condition of said adding means, said phase locked loop system including:

1. a source of oscillations at a frequency above said given freuency band;
2. means for modulating the amplitude of said oscillations from said source in accordance with said demodulated signal output of said frequency demodulation apparatus;
3. gating means for passing an output of said modulating means when enabled;
4. means for periodically enabling said gating means, said enabling means being responsive to an output of said separating means;
5. a source of reference oscillations at a desired output color subcarrier frequency;
6. a phase detector for comparing the phase of signals passed by said gating means with the phase of said reference oscillations; and
7. means for utilizing the output of said phase detector to control the frequency of said oscillations subject to modulation by said modulating means.

7. Apparatus in accordance with claim 6 wherein said signal processing means also includes:

a 1H delay line, shared by said first and second comb filter means; and means for applying an output of said modulating means to the input of said 1H delay line.

8. Apparatus in accordance with claim 7 also including:

player control means for selectively removing said pickup appartus from said playback position;

means coupled between said player control means and said initiating means for rendering said initiating means responsive to said selective removal of said pickup apparatus from said playback position in such manner that squelch signal development is initiated in response to said selective removal within a time period which is short relative to said given length of time; and wherein the operation of said termination delaying means is such that termination of squelch signal development, once such development is initiated, occurs only upon passage of a time interval, of a duration corresponding to said chosen time period, which is free of both said defect indication pulse development and said selective removal.

9. Apparatus in accordance with claim 8 wherein said given length of time is of the order of 50 milliseconds, wherein said period of time of predetermined length is of the order of 3 microseconds, and wherein said chosen time period is of the order of 1 second.

10. In a record player, including pickup apparatus for recovering from a record, when said pickup apparatus is in a playback position, carrier waves subject to frequency modulation in accordance with a composite video signal occupying a given frequency band; the combination comprising:

frequency demodulation apparatus responsive to a carrier wave output of said pickup apparatus for developing a demodulated signal output substantially confined to said given frequency band;

means for processing said demodulated signal output of said frequency demodulation apparatus to develop an output composite video signal;

player control means for selectively removing said pickup apparatus from said playback position;

means coupled to said player control means for initiating development of a squelch signal in response to initiation of selective removal of said pickup apparatus from said playback position by said player control means;

means for delaying the termination of squelch signal development relative to the termination of removal of said pickup apparatus from said playback position for a chosen time period;

means for utilizing said squelch signal to inhibit development of said output composite video signal by said signal processing means.

11. Apparatus in accordance with claim 10 also including:

means coupled to said frequency demodulation apparatus for identifying departures of the instantaneous frequency of the input to said demodulation apparatus from a given frequency deviation range; and means for developing defect indication pulses in response to the output of said departure identifying means;

and wherein said squelch signal development initiating means is additionally responsive to the output of said defect indication pulse developing means for initiating development of a squelch signal when the duration of a defect indication pulse exceeds a given length of time; and wherein said delaying means also serves to delay the termination of squelch signal development relative to the termination of defect indication pulse development for said chosen time period, said chosen time period being long relative to said given length of time.

12. Apparatus in accordance with claim 10 wherein said composite video signal includes a deflection synchronizing component, a color synchronizing component and picture signal components comprising a luminance signal component occupying said given frequency band and a chrominance signal component sharing a portion of said given frequency band, and wherein said signal processing means includes:

first comb filter means responsive to said demodulated signal output of said frequency demodulation apparatus for developing a first comb filtered signal output including said deflection synchronizing component and said luminance signal component, to the substantial exclusion of said color synchronizing component and said chrominance component;

second comb filter means responsive to said demodulated signal output of said frequency demodulation appartus for developing a second comb filtered signal output, in a band of frequencies above said given frequency band, and including said color synchronizing component and said chrominance component, to the substantial exclusion of said deflection synchronizing component and said luminance component; and adding means responsive to the respective outputs of said first and second comb filter means for forming said output composite video signal; and wherein said squelch signal utilizing means comprises means for applying said squelch signal to said adding means to disable said adding means.

13. In a record player, including pickup apparatus for recovering from a record carrier waves subject to frequency modulation in accordance with a composite video signal occupying a given frequency band; said composite video signal including a deflection synchronizing component, a color synchronizing component and picture signal components comprising a luminance signal component occupying said given frequency band and a chrominance signal component sharing a portion of said given frequency band; said pickup apparatus including a stylus supported by a pickup arm; the combination comprising:

selectively energizable means for controlling the position of said pickup arm; said arm position controlling means, when energized, serving to position said pickup arm in a playback position;

frequency demodulation apparatus responsive to a carrier wave output of said pickup appartus for developing a demodulated signal output substantially confined to said given frequency band;

means for processing said demodulated signal output of said frequency demodulation apparatus to develop an output composite video signal; said signal procesing means including:

a. first comb filter means responsive to said demodulated signal output of said frequency demoduation apparatus for developing a first comb filtered signal output including said deflection synchronizing component and said luminance signal component, to the substantial exclusion of said color synchronizing component and said chrominance component;

b. second comb filter means responsive to said demodulated signal output of said frequency demodulation apparatus for developing a second comb filtered signal output, in a band of frequencies above said given frequency band,and including frequency shifted versions of said color synchronizing component and said chrominance component, to the substantial exclusion of said deflection synchronizing component and said luminance component; and c. adding means responsive to the respective outputs of said first and second comb filter means for forming said output composite video signal;

means coupled to said arm position controlling means for developing a squelch signal in response to de-energization of said arm position controlling means, said squelch signal developing means including means for delaying the termination of squelch signal development relative to initiation of the energization of said arm position controlling means; and means for utilizing said squelch signal to inhibit development of said output composite video signal by disabling said adding means.

14. Apparatus in accordance with claim 13 wherein said signal processing means also includes:

d. a 1H delay line, shared by said first and second comb filter means e. means for recovering said deflection synchronizing component to the substantial exclusion of other components of said composite video signal, said synchronizing component recovering means being responsive to an output of said first comb filter means; and f. a phase locked loop system, subject to operation with independence of the disabled or enabled condition of said adding means, said phase locked loop system including:

1. a source of oscillations at a frequency above said given frequency band;
2. means for modulating the amplitude of said oscillations from said source in accordance with a demodulated signal output of said frequency demodulation apparatus;
3. gating means for passing an output of said modulating means when enabled;
4. means for periodically enabling said gating means, said enabling means being responsive to an output of said synchronizing component recovering means;
5. a source of reference oscillations at a desired output color subcarrier frequency;
6. a phase detector for comparing the phase of signals passed by said gating means with the phase of said reference oscillations; and
7. means for utilizing the output of said phase detector to control the frequency of said oscillations subject to modulation by said modulating means; and g. means for applying an output of said modulating means to an input of said 1H delay line; and wherein the delay imparted by said termination delaying means is long relative to the time between successive periods of enabling of said gating means.

* * * * *